March 6, 1973 D. M. ROUSE 3,719,815

MEMORY CODING TECHNIQUE

Filed July 26, 1971 2 Sheets-Sheet 1

MEMORY CODING TECHNIQUE
Filed July 26, 1971 2 Sheets-Sheet 2
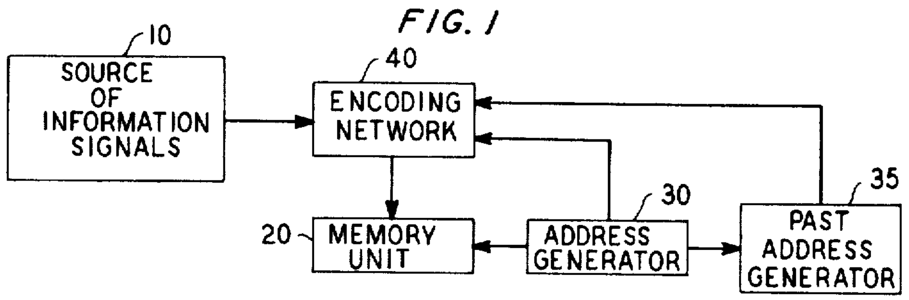
FIG. 2
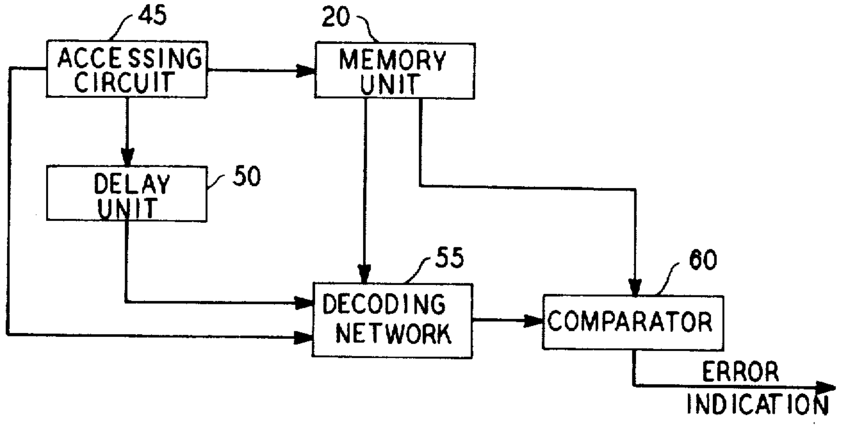
FIG. 3
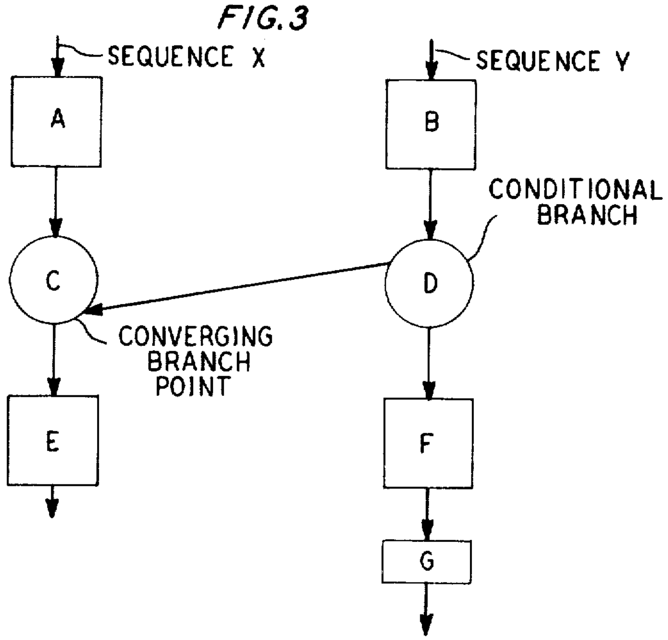

United States Patent Office 3,719,815
Patented Mar. 6, 1973

3,719,815
MEMORY CODING TECHNIQUE
David Michael Rouse, Columbus, Ohio, assignor to Bell Telephone Laboratories, Incorporated, Murray Hill, N.J.
Filed July 26, 1971, Ser. No. 166,130
Int. Cl. G06f *11/00;* G11c *29/00*
U.S. Cl. 235—153 AM 6 Claims

ABSTRACT OF THE DISCLOSURE

The present invention includes apparatus for generating a first set of check signals encoding not only the address and information bits of a selected word stored in the memory of a stored program machine, but also the address of a preceding word, which may be a transfer word directing a transfer to another word. This first set of check signals is stored in memory with the selected word. Upon retrieval, a second set of check signals is generated for the address and information bits of the selected word and the address of the preceding word. The first and second sets of check signals are compared. Failure of the check sets to match indicates an error in the address, information or order of retrieval of the selected word.

BACKGROUND OF THE INVENTION

Field of the invention

This invention relates to data processing techniques and, more particularly, to techniques for ensuring the accurate and proper sequential order of retrieval of information in a stored program machine.

A stored program machine or computer is typically characterized as one in which program instructions are stored in memory along with the data on which the instructions operate. Frequently, such instructions take the form of subroutines which are retrieved periodically, as required perhaps, by a master routine. The subroutines typically comprise a number of steps or instructions, the first instruction of which will be referred to as a transferee instruction, which must be performed in order.

As a simple illustration, the master routine might be arranged to compute the roots of the quadratic equation $ax^2+bx+c$ for several sets of data. It is apparent that each solution for $x$ requires the calculation of $\sqrt{4ac}$. Thus, the set of instructions for performing this square root calculation can be stored in the computer memory as a subroutine. The master routine then includes a transfer indication whenever the square root calculation is required and the square root subroutine is retrieved from memory in response thereto. Clearly, it is essential that the transferee and subsequent instructions of the subroutine be correctly accessed since an improperly accessed word will result in erroneous results, or, at least, the loss of valuable computer time before the error is detected.

In the type of system to which the present invention is applicable, each word typically stored in digital form in memory occupies a location having a unique address which is also typically represented in the form of a digital word.

A number of checking schemes have been employed in the prior art to detect the incorrect storing of such instruction words. For example, a coded representation based on the information content of an instruction (or other) word is often generated at the time of storage and this encoded representation is compared with another such representation upon retrieval of the word from memory. This coded representation often takes the form of one or more "parity" bits which are appended to the instruction data or other content of the word in question.

The parity or check bits are then stored and retrieved with the remainder of the word.

The exact form and number of these parity bits varies, depending upon the complexity (and therefore the error resolving power) of the associated parity code employed. The details of these codes and the circuitry for actually implementing them are well known in the art and form no necessary part of the present invention. A useful reference dealing with such parity codes is Hamming "Error Detecting and Error Correcting Codes," Bell System Technical Journal, vol. 29, pp. 147–160, April 1950.

It is also well known in stored program systems to encode not only the information content of words stored therein, but to encode the address content of those words also. Thus, data stored at incorrect addresses, as well as incorrect information bits, are readily detectable. (See, for example, L. S. Tuomenoksa Pat. 3,231,858 issued Jan. 25, 1966.) However, these prior art schemes do not detect the erroneous retrieval of a word having an entirely different (though internally consistent) address from the one intended since the information and parity portions of the word retrieved are correct for the address accessed.

A different prior art technique, provides some protection against improper transfers within the memory. In accordance with this technique, a so-called transfer-allowed bit is appended to certain words in memory to which a transfer may properly be made. However, since there are, characteristically, a number of such valid transferee words, although perhaps only a single correct one, an incorrect word having a transfer-allowed bit can still be accessed without the error being detected. Such a system is described, for example, in F. S. Vigliante Pat. 3,283,307, issued Nov. 1, 1966 and assigned to the assignee of the present invention.

Accordingly, it is an object of the present invention to improve the reliability of stored program machines.

More particularly, it is an object of the present invention to detect errors in the sequential retrieval of words stored in the memory of a stored program machine. It is a related object of the present invention to detect errors in the address and information content of those words as well.

It is a still further object of this invention to reduce the storage facilities required to provide such error detection.

BRIEF SUMMARY OF THE INVENTION

In accordance with the preferred embodiment of the present invention, a code bit or bits (designated a code word) is associated with each word in a computer memory storage unit. Each such code word spans the information content of a given word to which it is appended, the address of this given word and the address of the word to be accessed immediately prior to the given word. Spanning in the present context is understood to mean encoding over the designated spanned information. Thus, in accordance with the techniques of the present invention, information relating to the program sequence, as well as to the instruction (or other) words stored in memory and the address at which these words are stored is actually encoded and the resulting code words are stored in the memory unit.

It is therefore a feature of the present invention that encoding and decoding circuitry be provided for generating code words based, in part, on the memory addresses of sequentially accessed instructions, including in appropriate cases transfer and transferee words.

It is an additional feature of the present invention that the encoding circuitry be arranged to span the content of a word to be stored in a currently accessed memory location and to store a resulting code word in a portion of memory associated with the currently accessed memory location.

It is a further feature of the present invention that comparing means be provided for comparing the code words generated by the encoding circuitry upon retrieval of a word from memory and the code word previously associated with the retrieved word.

A complete understanding of the present invention and of the above and other features and advantages thereof may be gained from a consideration of the following detailed description of an illustrative embodiment thereof presented hereinbelow in conjunction with the accompanying drawing in which:

FIGS. 1 and 2 depict the encoding and decoding portions, respectively, of an error detection system embodying the principles of the present invention;

FIG. 3 shows a flow diagram of illustrative dynamic program sequences to which the apparatus and techniques of the present invention are applicable.

DETAILED DESCRIPTION

Figures 1A, 2A:
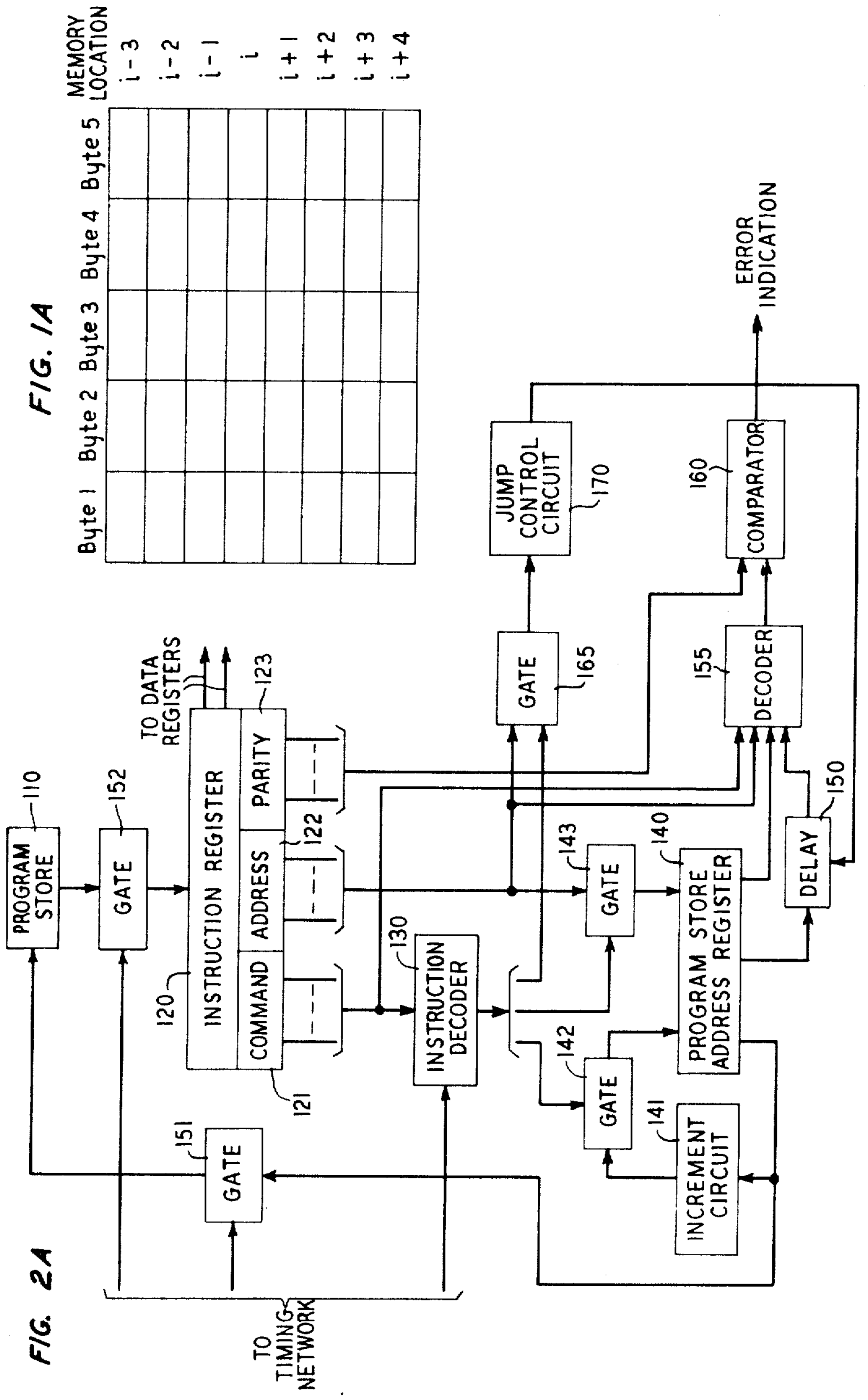
FIG. 1A shows a typical storage pattern for the memory unit shown in FIGS. 1 and 2.
FIG. 2A illustrates the decoder of an alternate embodiment of the present invention.

An initial reference to FIG. 3 may prove helpful in acquiring an understanding of the operations involved in practicing the present invention. Shown in FIG. 3 are two program sequences, sequences X and Y, which are typical of a broad range of such sequences commonly stored and executed in general (or special) purpose computers. Sequence Y in FIG. 3 includes a "conditional branch" instruction which in typical fashion reroutes the course of processing upon the satisfaction of a specified condition. More will be said about this branching operation below. For present purposes only the sequential accessing of instructions (or other data) in, say, sequence Y need be considered.

In the normal course of processing sequence Y (with the "condition" associated with word D unsatisfied), the words in sequence Y are desirably accessed in the order B, D, F, and G. Accordingly, in using the most straightforward and commonly used techniques, the words B, D, F, and G will be stored in order in consecutive locations in the computer memory. Upon execution of sequence Y, then, all that is required is to repetitively increment the program counter commonly found in computers. The apparatus of the present invention includes means to insure that the incrementing of the program counter has been effected correctly.

The purpose to be served by an encoder (such as that shown in FIG. 1) in accordance with the present invention is to generate a code word representative of both the content and memory address of a currently processed word (e.g., G in FIG. 3). In accordance with a preferred embodiment of the present invention this code word is also arranged to be representative of the address of the immediately preceding word in the sequence of words being processed (e.g., F in FIG. 3 when the "current" word accessed is G).

Referring to FIG. 1, then, there is depicted a source of information signals 10 for generating digital words representing information or program instructions to be stored in memory unit 20. Address generator 30 generates signals identifying the location in memory unit 20 at which the information signals are to be stored. Past address generator 35 responds to the signals generated by address generator 30 to produce signals representing the address of the location which, according to the program routine, is to be accessed immediately prior to the location whose address is generated by address generator 30. Thus, as an information signal is generated by source 10, its address is simultaneously generated by address generator 30. In addition, past address generator 35 generates the address of the location which will be accessed just before the address generated at address generator 30. Encoding network 40 encodes these signals in accordance with a particular desired encoding scheme. Encoding network 40 typically comprises a Hamming encoder in accordance with the teachings of Gallager, Information Theory and Reliable Communication, Wiley 1968 (especially chapter 6) and other techniques well known in the art. Typical apparatus for generating the required code signals is described further in, e.g., U.S. Reissue Pat. 23,601, issued Dec. 23, 1952 to R. W. Hamming et al.

It will be assumed, for purposes of illustration, that each of the digital words generated by a source 10 in FIG. 1 comprises 32 bits. It is convenient for some purposes to consider these 32-bit words to be organized into four 8-bit bytes. Each of these 8-bit bytes may be stored in a corresponding 8-bit portion of a memory location in memory 20 as shown in part in FIG. 1A. These are indicated in FIG. 1A as bytes 1 through 4. The portion of memory 20 indicated in FIG. 1A as byte 5 of, say location *i*, is typically reserved for the code word associated with the information stored in bytes 1–4 of location *i*, the address of location *i* and the address of the immediately preceding location.

It is also assumed for purposes of definiteness that the location of any given word in memory unit 20 in FIGS. 1, 1A and 2 is fully specified by a pattern of 8 bits. This, of course, applies to a current address, such as *i* in FIG. 1A, as well as the preceding address, $i-1$ (assuming a transfer instruction did not cause location *i* to become the current address). Thus the check word stored in byte 5 of location *i* is one which is based on, or spans, the 32 bits of data to be stored in location *i*, the 8 bits of data associated with the address of location *i* and the address of the location for the immediately preceding 32-bit word processed by the system. Thus, each code or check word generated by encoding network 40 in FIG. 1 will be considered to comprise an additional 8-bit byte. In short, then, these 8 check bits may be considered to form a "parity word" based on the associated information and address words comprising $32+8+8=48$ bits.

After the information signals and addresses have been encoded, the information signals and code signals are stored in memory unit 20 at the loctaion specified at address generator 30.

After being once stored in memory unit 20, the information and check bytes are typically repetitively accessed as required during the processing of data in accordance with the stored program sequences. Upon each accessing of, say, memory location *i*, a new encoding of the information stored at location *i* and of the address of location *i* and that of the immediately preceding address is effected. This process, by analogy to the more common communication coding arts, will be referred to as "decoding."

FIG. 2 illustrates the decoding apparatus of a preferred embodiment of the present invention. In accordance with FIG. 2, then, accessing unit 45, under normal program control, generates successive addresses specifying locations from which information signals stored in memory unit 20 are to be read. Accessing unit 45 is functionally identical to that found in most general purpose computers and other systems using word-organized memories and can be easily implemented by an ordinary worker in the art. In particular, design methods for such a circuit are included in Digital Computer Design Fundamentals by Yaohan Chu, McGraw-Hill Book Co., Inc., 1962, at chapter 12, sections 6 and 7. Alternatively, accessing unit 45 can comprise a programmed store for producing the desired memory location address in response to external stimulus. Program design for accomplishing this purpose is well within the skill of a worker in the art. See, for example, Microprogramming: Principles and Practices by Samir S. Husson, Prentice Hall, Inc., 1970. As information signals are read from memory unit 20, the address in accessing unit 45 is replaced by the address of the next location to be accessed and the first-mentioned address is shifted into delay unit 50. Thus, the address of each word accessed from memory unit 20 is available in accessing unit 45 and the address of the location accessed just before it is stored in delay unit 50.

For each memory location accessed, decoding network 55 generates a code in the same manner described above for encoding network 40. Briefly, in accordance with the encoding algorithm, decoding network 55 encodes the information signals from the currently accessed word in memory unit 20, the current memory address of those signals as read from accessing unit 45 and the address of the previously accessed word stored in delay unit 50.

Comparator 60 compares the code generated by encoding circuit 40 and stored with the information signals in memory with the code signals generated by decoding network 55. A failure of the compared code signals to match indicates an error in the information or address signals of the word accessed or, more importantly, the sequence in which the address was accessed. The signal generated by comparator 60 upon such a mismatch may be used to stop program execution, to cause a transfer to another point in processing or otherwise follow an error control procedure, usually by means of special programs stored in memory 20.

The foregoing discussion describes apparatus used in a preferred embodiment of the present invention for checking programming sequences. The above-described embodiment of this invention is further adaptable to check program routines which include jump or transfer instructions.

Consider, for example, a simple jump or transfer instruction such as that included in the dynamic sequencing routine illustrated in FIG. 3.

In accordance with this routine, sequence X includes instruction A, node C and instruction E. Similarly, sequence Y includes instruction B, node D and instructions F and G. As indicated in FIG. 3, node D is a so-called conditional branchpoint. That is, node D includes a conditional jump instruction which will cause one of a number of possible addresses (two, in this example) to be selected to designate the next instruction to be accessed. This selection is made in standard fashion depending upon some property of one or more numerical expressions or other conditions (hence, the name, "conditional branch").

With respect to node C, then, it is clear that, as it stands, there are two possible addresses corresponding to the immediately preceding address, that of instruction A and that of node D. That is, each of these addresses may proprely precede the address of node C. Correspondingly, there are two possible code words which may be stored in byte 5 of the location in memory corresponding to node C and which may be generated by decoding network 55 upon accessing this location.

In accordance with an illustrative embodiment of the present invention, however, simple modifications are made to the system to effect unambiguous sequence checking in such a situation. One such modification includes the addition of apparatus which permits the address of A to be stored at node D along with the transfer instruction at node D. The code word stored at node C, then is arranged to include a check on the address of A only. Thus, whether the transfer proceeds from instruction A to node C or from node D to node C, the address of A is available as the preceding address for calculating the comparison check word.

Apparatus in accordance with the present invention incorporating still a different arrangement for effecting sequence checking of a system capable of executing jump instructions is depicted in FIG. 2A. As shown in FIG. 2A, a program store 110, operating through an instruction register 120 and an instruction decoder 130 serves as a source of instructions which are executed by data registers (not shown) acting in conjunction with a data store (not shown). For simplicity, the program store 110 is a separate unit from the data store, but the same unit, for example, a magnetic core matrix of well-known construction may be used for both. In addition, the various constituent gates, registers, and decoders of the figure are of standard design.

Before an instruction can be executed, it must be taken out of storage. This is done by a program address register 140 whose coded output gives the location of the instruction in the program store 110. After the code signals forming the address are gated in parallel through a program address gate 151 to the program store, the associated instruction passes through a preliminary register gate 152 into the instruction register 120. Both gates 151 and 152 are enabled from a timing network (not shown) of conventional construction. The instruction entering the register 120 conventionally has two portions—a coded command that enters a first section 121 of the register 120 and a coded address that enters a second section 122 of the register 120. The command is translated by the decoder 130, which is operated by the timing network; the address is dispatched to the data store and registers.

Under ordinary circumstances, where the steps of the program follow in sequence, by accessing consecutive memory locations, each succeeding address at the output of the program address register 140 is obtained by augmenting its predecessor by unity through the operation of a standard increment circuit 141 and an increment circuit gate 142. However, when a transfer is to take place, the address indicated by the program address register 140 must be modified to accord with the location in the program store 110 of the first instruction to which a transfer is to be made. This modification is carried out through the use of a transfer instruction whose address portion does not refer to a location in the data store, but rather to a transfer location in the program store. When the transfer instruction enters the register 120, the decoder 130 operates a transfer gate 143, causing the transfer address in the register 120 to enter the program address register 140 where the preexisting address is either replaced or modified. In that event, the next instruction entering the register 120 should be the first, i.e., transferee, instruction of a subset to which a transfer is being made.

To provide an indication of whether or not the transfer takes place properly, the invention provides for a delay unit 150, which typically comprises a shift register, for storing the address of the immediately preceding accessed word. When no jump instruction is encountered the operation of the system is as shown in FIG. 2 and described above. Jump control circuit 170 is arranged to respond to a jump or transfer indication being stored in the command portion 121 of instruction register 120 to change the address stored in delay unit 150 to an appropriate value associated with the address portion 122 of instruction register 120. Again, jump control circuit 170 can be either a circuit designed in accordance with the Chu reference cited above or a program formulated in accordance with the above-cited Husson reference. In the latter instance jump control circuit 170 comprises a microprogram store addressed by the address portion 122 of instruction register 120 as gated by gate 165 in response to a signal from the instruction decoder 130 indicating that a jump instruction such as D in FIG. 3 is present. The microprogram store then responds with the memory address for the instruction A. Thus in accordance with the alternate embodiment of FIG. 2A there is provided circuitry which, in response to the condition giving rise to the jump transfer, "forces" the address of D to be changed to that of A.

Decoder 155 in FIG. 2A is of the same type as that used in the circuit indicated by the block 55 in FIG. 2. The inputs to decoder 155 are once again the current and preceding addresses and the information stored in the currently accessed word. This latter information is seen to include command and address portions, corresponding to the contents of registers 121 and 122, respectively. The output of decoder 155, in common with the operation of the equivalent circuitry of FIG. 2, is delivered to comparator 160 as is the parity portion of the current word stored in parity register 123.

While the detailed explanation of the alternate embodiment of FIG. 2A has emphasized the decoding (that is, the comparison of present and past encoding of the memory contents and the various addresses), it is clear that equivalent techniques may be used for determining the parity words to be stored at each memory location.

It should be understood that the above-described arrangements are illustrative only. Numerous other arrangements may be devised by those skilled in the art without departing from the spirit and scope of the invention. For example, it is clearly within the spirit and scope of the present invention that the contents of the foregoing word be encoded with the contents and address of the succeeding word rather than the address of that foregoing word. Similarly, other combinations of information bits included in the predecessor word and the successor word encoded to yield a check on the sequence of retrieval are again within the scope of the present invention. It is also clear in light of the present invention, as disclosed herein, that sequences of more than two words can be thus encoded. For instance, the addresses of two preceding words can be encoded with the address of a third. It is also apparent that coding techniques, other than the parity scheme described with respect to the preferred embodiment, can be used to achieve greater reliability.

It should be further understood that the byte and word lengths given in the foregoing description are merely illustrative. Similarly, the address-indicating words are not necessarily limited to 8 bits or any other length. If for any reason 8-bit address words are convenient for encoding purposes, it is sometimes convenient to use only the low order 8 bits in a larger address-specifying field.

In some realizations of the present invention it may be desirable to provide separate byte stores for each of the columns of bytes of the type shown in FIG. 1A. When this is the case, and where separate address determining circuitry is used for each byte memory, additional reliability is introduced because the likelihood of an identical accessing error being made at the same by more than one byte store is quite unlikely.

What is claimed is:

1. In a system having a memory for storing a plurality of program and data words, apparatus for detecting an error in the content or sequencing of a plurality of said words accessed from said memory comprising:

(A) means for generating for each word stored in said memory a first code word representative of the information content of that word, and of the location at which that word is stored in said memory and of the location of a word desired to be accessed in accordance with a predetermined ordered relationship to that word, (B) means for storing said first code words, (C) means for retrieving the code word associated with a given program or data word upon the accessing of said given word, (D) means for generating for the program or data word most recently accessed from said memory a second code word representative of the information content of that word, and of the location from which that word was accessed, and of the location from which a word bearing said predetermined ordered relationship to said most recently accessed word was accessed, and (E) means for generating an error signal whenever the first and second code words associated with an accessed word do not bear a predetermined relationship to each other.

2. Apparatus according to claim 1, wherein said means for generating an error signal comprises a comparator arranged to generate an output signal whenever said first and second code words are different.

3. Apparatus according to claim 1, wherein said means for generating said first code words and said means for generating said second code words each comprises a parity check circuit.

4. Apparatus according to claim 3, wherein said means for generating said first code words further comprises means for selecting the word intended to be accessed immediately prior to the word whose information content is represented by said first code word as said word intended to be accessed in accordance with said predetermined relationship.

5. Apparatus according to claim 4, wherein said means for generating said second code words comprises means for selecting the location of the word actually accessed immediately prior to said most recently accessed word as the location of said word bearing said predetermined relationship to said most recently accessed word.

6. Apparatus according to claim 4, wherein said means for selecting in said means for generating said second code words comprises means for storing the address of the location from which a most recently accessed word was accessed until after the following word is accessed from said memory, and means for applying said stored address to said parity check circuit in said means for generating said second code words.

References Cited

UNITED STATES PATENTS

| | | | |
|---|---|---|---|
| 3,231,858 | 1/1966 | Tuomenoksa et al. | 235—153 X |
| 3,387,262 | 6/1968 | Ottaway et al. | 235—153 X |
| 3,536,902 | 10/1970 | Cochran et al. | 235—153 |
| 3,576,982 | 5/1971 | Duke | 235—153 |
| 3,585,378 | 5/1971 | Bouricius | 253—153 |
| 3,599,146 | 8/1971 | Weisbecker | 235—153 |

MALCOLM A. MORRISON, Primary Examiner

R. S. DILDINE, Jr., Assistant Examiner

U.S. Cl. X.R.

340—172.5